United States Patent [19]

Borghard et al.

[11] Patent Number: 5,102,839
[45] Date of Patent: Apr. 7, 1992

[54] ZEOLITES OF INCREASED HYDROGEN ADSORPTION CAPACITY

[75] Inventors: William S. Borghard, Yardley, Pa.; Stuart D. Hellring, Trenton, N.J.

[73] Assignee: Mobil Oil Corporation, Fairfax, Va.

[21] Appl. No.: 637,936

[22] Filed: Jan. 9, 1991

Related U.S. Application Data

[63] Continuation of Ser. No. 39,251, Apr. 17, 1987, abandoned, which is a continuation-in-part of Ser. No. 789,267, Oct. 15, 1985, abandoned.

[51] Int. Cl.$^5$ .................. B01J 29/10; B01J 29/20
[52] U.S. Cl. .......................... 502/66; 502/74
[58] Field of Search .................. 502/66, 71, 73

[56] References Cited

U.S. PATENT DOCUMENTS

| | | | |
|---|---|---|---|
| 3,404,086 | 10/1968 | Plank et al. | 208/120 |
| 3,644,200 | 2/1972 | Young | 208/120 |
| 4,257,885 | 3/1982 | Grose et al. | 210/691 |
| 4,444,900 | 4/1984 | Chang et al. | 502/71 |
| 4,478,806 | 10/1984 | Ball et al. | 423/328 |
| 4,503,023 | 3/1985 | Breck et al. | 423/328 |
| 4,524,055 | 6/1985 | Onodera et al. | 423/328 |
| 4,599,475 | 7/1986 | Kresge et al. | 502/71 |
| 4,601,993 | 7/1986 | Chu et al. | 502/66 |

FOREIGN PATENT DOCUMENTS

| | | | |
|---|---|---|---|
| 0134330 | 8/1983 | European Pat. Off. | 29/28 |
| 0148626 | 12/1984 | European Pat. Off. | 29/6 |

OTHER PUBLICATIONS

P. A. Sermon and G. C. Bond, Catalysis Reviews, 1973, pp. 211-239, "Hydrogen Spillover".

G. M. Pajonk, S. J. Teichner and J. E. Germain, Studies in Surface Science and Catalysis 17, "Spillover of Adsorbed Species", pp. 1-16, (1983).

Tanay, Pajonk, Steinberg & Teichner, Applied Catalysis, 39 (1988), "Hydrogen Spillover Activation of H--Erionite for the Hydroconversion of n-Heptane", pp. 89-91.

Chu, Cynthia T-W. and Clarence D. Chang, "Isomorphous Substitution in Zeolite Frameworks. 1. Acidity of Surface Hydroxyls in [B]-, [Fe]-, [Ga]-, and [Al]-ZSM-5", J. Phys. Chem., vol. 89, 1569-1571 (1985).

Datka, J., et al., "Hydroxyl Groups and Acid Sites in Na ZSM-5 Zeolites Studied by I.R. Spectroscopy", Zeolites, 1985, vol. 5, Jul., pp. 230-232.

Jacobs, P. A. and Roland von Ballmoos, "Framework Hydroxyl Groups of H-ZSM-5 Zeolites", J. Phys. Chem. 1982, 86, pp. 3050-3052.

*Primary Examiner*—Carl F. Dees
*Attorney, Agent, or Firm*—Alexander J. McKillop; Charles J. Speciale; Marina V. Schneller

[57] ABSTRACT

Hydroxyl rich zeolites containing 0.1 to 20 weight percent of a hydrogenation/dehydrogenation metal are described which have increased hydrogen adsorption capacity.

5 Claims, 4 Drawing Sheets

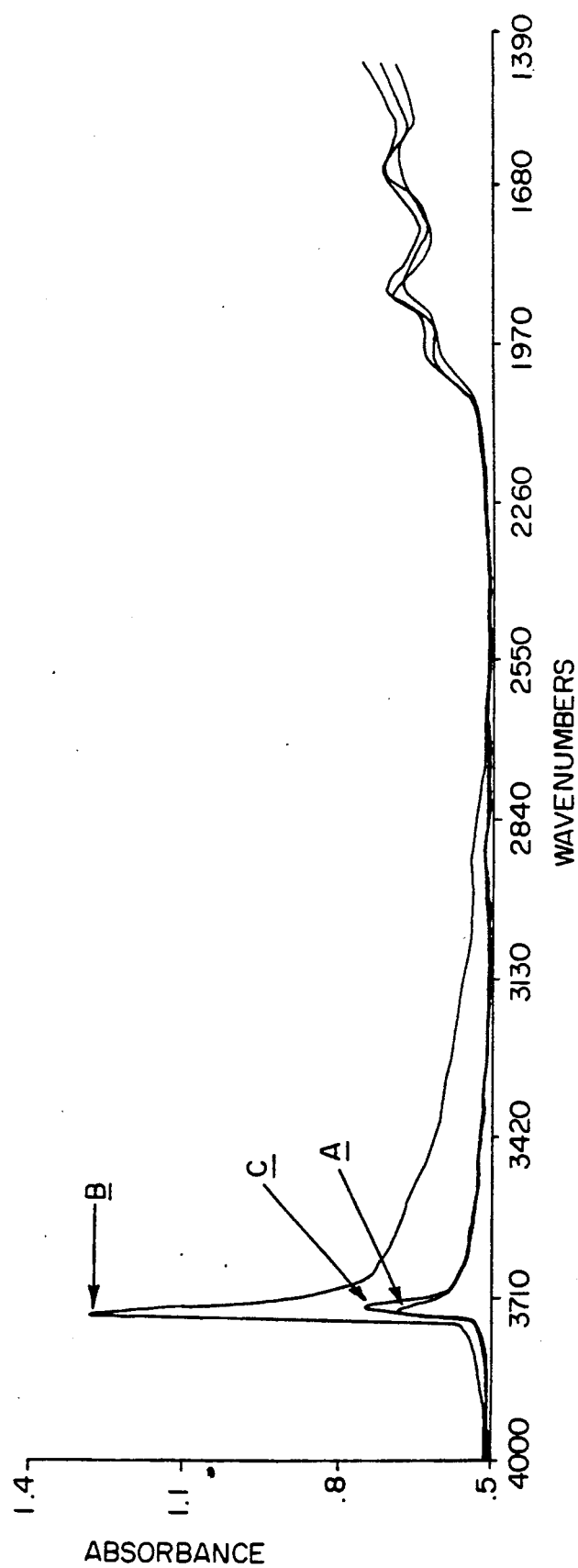

ZEOLITES OF INCREASED HYDROGEN ADSORPTION CAPACITY

This is a continuation of copending application Ser. No. 039,251, filed on Apr. 17, 1987 (and now abandoned) which is a continuation-in-part of copending application Ser. No. 789,267, filed Oct. 15, 1985 and now abandoned, which is relied upon and incorporated by reference herein.

1. Field of the Iinvention

The invention is directed to new catalytic compositions comprising a hydrogenation/dehydrogenation metal and a hydroxyl-rich zeolite. The hydroxyl-rich zeolite is prepared by ammonia treatment of sieves which have suffered a loss of tetrahedral aluminum followed by an elevated temperature treatment of a maximum temperature of about 450° C.; the hydroxyl groups created by this method are stable only to 500° C. The catalytic compositions have increased capacity to adsorb hydrogen which is determined by the fact that the measurements indicate that the ration of atomic hydrogen to hydrogenation/dehydrogenation metal exceeds 1 (one).

2. Bcakground of the Invention

Naturally occurring and synthetic zeolites have been demosntrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by unit structure of the crystal. The zeolites are referred to as "molecular sieves" because interconnecting channel systems created by pores of uniform pore size allow a zeolite to selectively absorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula

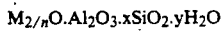
$$M_{2/n}O \cdot Al_2O_3 \cdot xSiO_2 \cdot yH_2O$$

In the empirical formula, x is equal to or greater than 2, since $AlO_4$ tetrahedra are joined only to $SiO_4$ tetrahedra, and n is the valence of the cation designated M. D. Breck, ZEOLITE MOLECULAR SIEVES, John Wiley & Sons, New York p. 5 (1974). In the empirical formula, the ratio of the total of silicon and aluminum atoms to oxygen atoms is 1:2. M was described therein to be sodium, potassium, magnesium, calcium, strontium and/or barium, which complete the electrovalence makeup of the empirical formula.

The crystal lattice framework of these aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing alumina is balanced by the inclusion in the crystal of a cation, for example an alkali metal, an alkaline earth metal or an organic cation. This can be expressed wherein the ratio of aluminum to the number of various cations, such as Ca/2, Sr/2, Na, K or Li, is equal to unity. One type of cation may be exchanged entirely or partially with another type of cation utilizing ion exchange techniques in a conventional manner. By means of such cation exchange, it has been possible to vary the properties of a given aluminosilicate by suitable selection of the cation. The cavities and pores are occupied by molecules of water prior to dehydration and/or possibly by organic species from the synthesis mixture in the as-synthesized materials.

The prior art describes a variety of synthetic zeolites. These zeolites have come to be designated by letter or other convenient symbols, as illustrated by zeolite A (U.S. Pat. No. 2,882,243); zeolite beta (U.S. Pat. No. 3,308,069 and Re 28341); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979) and zeolite ZSM-23 (U.S. Pat. No. 4,076,842), merely to name a few.

The silicon/aluminum atomic ratio of a given zeolite is often variable. For example, zeolite X can be synthesized with silicon/aluminum atomic ratios of from 1 to 1.5, while that ratio in zeolite Y is from 1.5 to 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871, reissued as RE. 29,948, discloses a porous crystalline silicate made from a reaction mixture containing no deliberately added aluminum and exhibiting the X-ray diffraction pattern characteristic of ZSM-5 zeolites.

Moreover, the silicon/aluminum atomic ratio of the "as-synthesized" zeolite can be altered, specifically increased, by decreasing the tetrahedral alumina thereof. Decrease in the tetrahedral alumina may be effected by synthetic methods developed to deplete the tetrahedral alumina of a zeolite. In addition, the silicon:aluminum atomic ratio of a zeolite may be increased, that is there may be a loss of tetrahedral alumina, as a result of process conditions to which the zeolite may be subjected during use. Process conditions which will effect depletion of tetrahedral alumina include high temperature calcination and steaming. This loss of aluminum does not affect the crystallinity of zeolites, such as ZSM-5.

Those zeolites of practical significance today are not only characterized by uniform pore sizes, but also by channel systems created by those pores. To maintain activity of a zeolite, the crystallographic structure of the zeolite after chemical treatment must remain in tact.

Various chemical treatments of zeolites have been proposed to modify their chemical properties. In accordance with the invention, additional hydroxy groups are incorporated into the zeolite. In J. Datka et al "Hydroxyl groups and acid sites in Na-ZSM-5 zeolites studied by i.r. spectroscopy" Zeolites Vol. 5 No. 4, p. 230 (July 1985), non-acidic hydroxyl group presence in Na-ZSM-5 was attributed to the i.r. band at about 3738 $cm^{-1}$; in addition, J. Datka et al referred to the i.r. work of Jacobs and Ballmoos who assigned OH groups vibrating at about 3720–3730 $cm^{-1}$, to extra zeolitic material which might be introduced into Na-ZSM-5 during synthesis or during the decomposition of organic entities in Na-ZSM-5.

More particularly, in accordance with the invention hydrogenation/dehydrogenation metal is incorporated into the hydroxy rich zeolite. A method is reported, in copending application Ser. No. 789,267, filed Oct. 15, 1985, for rendering zeolites hydroxyl-rich by gaseous ammonia treatment of steam (or high temperature) calcined zeolites, followed by calcination up to about 450° C. These new hydroxyls are stable to about 500° C.; above which they undergo rapid dehydration. That hydroxyl enrichment of Pt-supported on steamed zeolite gives a zeolite that exhibits hydrogen spillover. This allows thermally stable, dual-function, low acidity catalysts with increased dihydrogen chemisorption capacity.

The result is a material with a greater hydrogen capacity than is observed for the metal alone. Spillover is suggested from kinetic data for reactions including inter alia hydrogenation (olefins or aromatics), dehydrogenation, isomerization, chemisorption, and isotope exchange. Such data for silica and alumina is reported in Knorr, Z. in "Catalysis. Science and Technology" Anderson, J. R. and Boudart, M., ed., Vol 3, 1982, Springer-Verlag, New York, pp 231-280.

SUMMARY OF THE INVENTION

The invention is a catalytic composition comprising a hydrogenation/dehydrogenation metal and a hydroxyl rich zeolite having suffered a loss of framework aluminum. The catalytic composition has a hydrogen capacity greater than that attributable to the hydrogenation/dehydrogenation metal content of the catalytic composition, as determined by a ratio of atomic hydrogen to atomic metal (hydrogenation/dehydrogenation metal) which exceeds 1.

In the invention, the zeolites enriched with hydroxyl groups are readily prepared by ammonia treatment of sieves which have suffered loss of tetrahedral aluminum from framework positions followed by careful calcination at 200°-450° C. For example, creation of novel hydroxyl sites in ZSM-5 is evident from the appearance of a new stretching band near 3720 cm$^1$ in the FTIR spectrum. The new ir band is not present in the zeolite prior to this treatment. Zeolite beta similarly shows a significantly increased absorbance of the existing 3745 cm$^{-1}$ stretching band. Here, the new hydroxyls are indistinguishable from the terminal silanols, and only an increased concentration may be deduced. The preparation has been demonstrated for both steam and high temperature calcined zeolites (with and without supported metals).

DESCRIPTION OF THE DRAWINGS

In FIG. 2, A is an Fourier Transform infrared (FTIR) spectrograph of the sample of Example 1.

In FIG. 2, B is an FTIR spectrograph of the hydroxylated zeolite species containing platinum of Example 2.

In FIG. 2, C is an FTIR of hydroxylated zeolite species containing platinum after calcination at 500° C.

DESCRIPTION OF THE INVENTION

Figure 1:
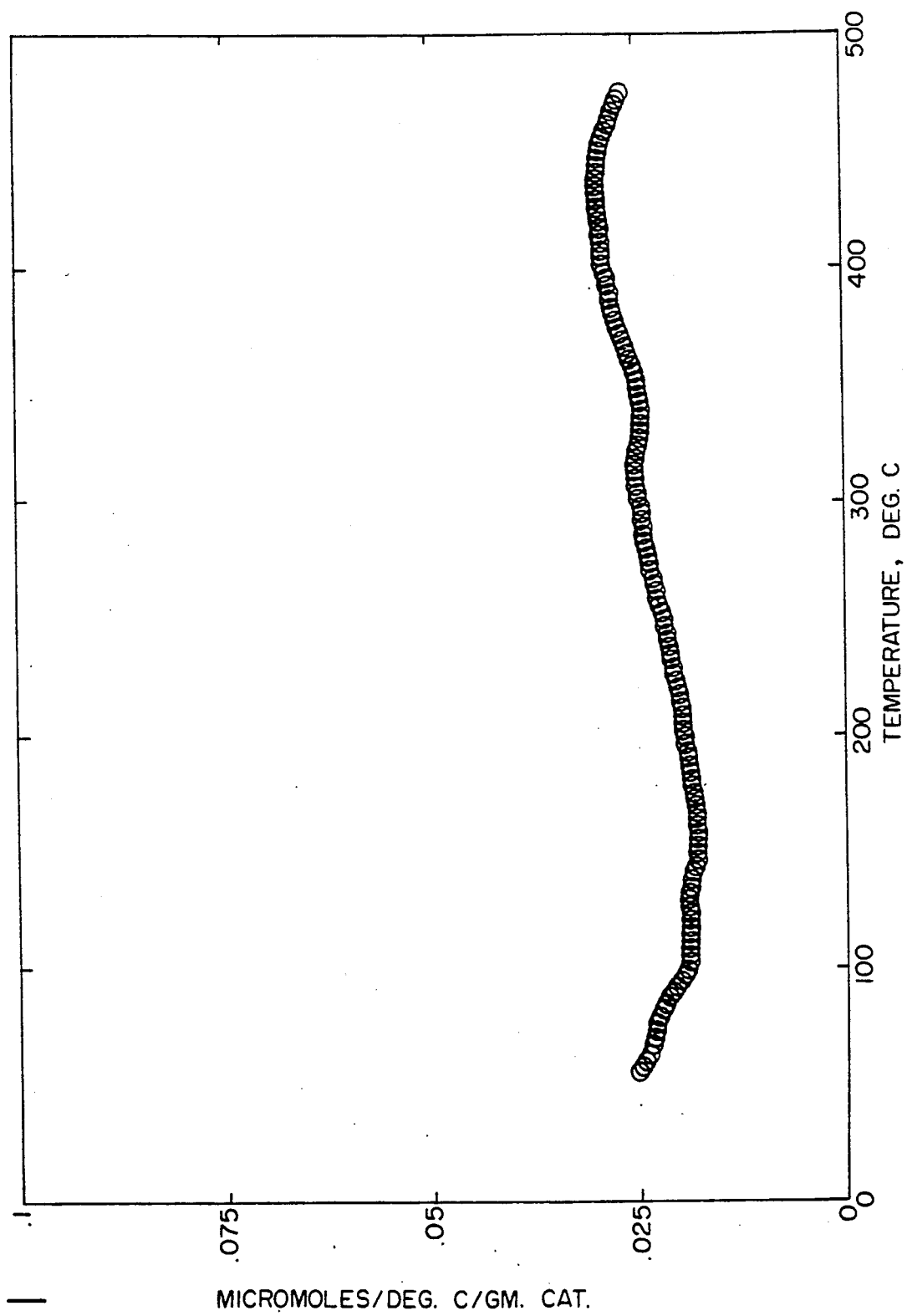
FIG. 1 is a graph of the plot of hydrogen desorbed from a dealuminated zeolite, supporting platinum as described in Example 1, vs. temperature.

Typical hydrogen transfer activity of amorphous oxide supports is modest at best. However, supports that are modified to contain transition metal to give spillover show increased activity. This implies that the hydrogen that migrates to the support is reactive, and the net result is a catalyst with enhanced total hydrogen capacity. Since transition metals supported on low acidity zeolites are used in many important processes involving hydrogen transfer, enhancing the hydrogen transfer capacity thereof is significant.

The composition of the invention comprises a hydrogenation/dehydrogenation metal and a zeolite, depleted in its as-synthesized aluminum content and hydroxylated to exhibit increased hydroxyl group content. The hydrogenation/dehydrogenation metal content of the composition can range from 0.1 to 20 weight percent of the composition, and more practically from 0.1 to 10 weight percent. The hydrogenation/dehydrogenation metal can be a transition metal, such as platinum, palladium, rhodium. It can be incorporated into the composition by exchange, impregnation or deposition, by art recognized techniques. When, for example, platinum is exchanged into the composition the acid form of the zeolite can be con exchanged with a solution of Pt(NH$_3$)$_4$Cl$_2$ at room temperature, with subsequent calcination.

Incorporation of the hydrogenation/dehydrogenation metal into the composition of the invention can be undertaken prior to, or after, zeolite modification to render it hydroxyl rich, as described below.

The hydroxylated zeolites used in accordance with the invention have suffered a loss of tetrahedral alumina, or, in other words, will have been partially or completely dealuminized. Prior to such aluminum loss, the zeolite will be in the acid form. The acid form of the zeolite, having SiO$_2$:Al$_2$O$_3$ mole ratio of less than about 500:1 will show absorbance in the i.r. at 3610 cm$^{-1}$. With decreasing SiO$_2$:Al$_2$O$_3$ ratios that absorbance at 3610 cm$^{-1}$ will increase. Such aluminum loss may be effected, for example, by high temperature (about 1000° C.) calcination. The Fourier Transform Infrared Spectrograph of zeolites prior to dealumination exhibit no absorbance at 3610 cm$^{-1}$; that is, the FTIR spectrograph of said reactants shows complete loss of the bridging hydroxyl stretching band at about 3610 cm$^{-1}$ associated with the Bronsted acid sites of zeolites. The FTIR spectrograph of the zeolite reactants also exhibits absorbance at about 3745 cm$^{-1}$ which is the characteristic stretching band of terminal silanols in the zeolites.

A class of zeolites which may be used in accordance with the invention includes those which exhibit a constraint index of 0.5 to about 12 over the temperature range of 550° F. to 950° F. The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. It is to be realized that the above constraint index values typically characterize the specified zeolites but that these are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables, such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is an approximation, taking into consideration the manner of its determination, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1000° F. and a liquid hourly space velocity of less than one, such as 0.1 or less, can be employed in order to achieve a minimum total conversion of about 10%.

The zeolites, ZSM-5 and zeolite beta, which had suffered loss of tetrahedral alumina were the subject of experiments reported in the Examples below. The zeolite ZSM-5 and zeolite beta, their preparation and their respective characteristic X-ray diffraction patterns are known. Zeolite beta, its preparation and its characteristic X-ray diffraction pattern are described in U.S. Pat. No. 3,308,069 and Re. 28,341, each of which is incorporated by reference herein. The zeolite ZSM-5, its preparation and its characteristic X-ray diffraction pattern are described in U.S. Pat. No. 3,702,886 and Re 29,948, each of which is incorporated by reference herein.

In accordance with the invention, the zeolite which exhibits a loss of tetrahedral aluminum is subjected to ammoniation. This ammoniation may be conducted by contacting the reactant zeolite with gaseous ammonia. An alternative method is to provide aqueous solutions of ammonium salts, including $NH_4OAc$, $NH_4Cl$, $NH_4NO_3$, and the like, or of ammonium hydroxide and contacting that reactant zeolite with said aqueous solutions containing a source of ammonium; conventionally, the normality of these solutions can be 0.1N to 1N in ammonium salts (although solution of higher normality may be employed) and contact times may range from about 1 to 24 hours, at ambient and elevated temperatures, optionally undertaken in a multi-stage ammonium ion exchange. However, in the experiments reported below, it was preferred to use gaseous ammonia to eliminate the possibility of a number of exchange reactions. Contact times with gaseous ammonia can range from less than one hour to 48 hours. The ammonia gas treatments reported below were undertaken in the presence of atmospheric humidity and thus were not undertaken under anhydrous conditions.

The ammonium-exchanged zeolite reactant is subjected to a controlled elevated temperature treatment. The maximum temperature of the range of temperatures, over which this heat treatment is conducted, should not exceed a temperature of about 450° C. measured at atmospheric pressure. Practically the temperature range of the elevated temperature treatment will range from 200° C to 450° C. measured at atmospheric pressure.

During this elevated temperature treatment in accordance with the invention $NH_3$ will be desorbed. The other novel result of this temperature treatment in accordance with the invention is the production of hydroxyl-rich zeolites. The hydroxylated zeolites of the invention have been corroborated by FTIR and thermogravimetric analysis, as reported in detail in the Examples. Creation of novel hydroxyl sites in ZSM-5 is evident from the appearance of a new stretching band near 3720 cm$^{-1}$ in the FTIR spectrum. The new ir band is not present in the zeolite prior to this treatment. Zeolite beta similarly shows a significantly increased absorbance of the existing 3745 cm$^{-1}$ stretching band. Here, the new hydroxyls are indistinguishable from the terminal silanols, and only an increased concentration may be deduced. The preparation has been demonstrated for both steam and high temperature calcined zeolites (with and without supported metals). The hydroxyl groups created by this procedure are stable only to 500° C., and are unique from any hydroxyls previously existing in the zeolite sample. The uniqueness of these hydroxyls is apparent from both their distinct FTIR absorbance in ZSM-5 at 3720 cm$^{-1}$, and from the rapid, dehydration observed by both FTIR and tga. Neither are observed in the original sample, before or after dealumination of the framework. In addition to their formation, the hydroxyls are destroyed by reagents known to react with this type of functionality (e.g. $SiCl_4$ and $AlCl_3$).

The criticality of the upper limit of the temperature treatment is reflected by the fact that the newly created hydroxyl groups are destroyed, with water loss, if the hydroxylated zeolite is heated to 500° C. When ammonia is expelled below 450°-500° C., a unique, sharp, stretching band remains near 3720 cm$^{-1}$ in the FTIR spectrum. This band is associated with a novel hydroxyl moiety, and has not been reported previously to our knowledge. Heating to near 500° C. causes a complete and rapid loss of these new hydroxyl groups. The rapid expulsion of water is also observed as a major weight loss ($T_{max}$) during tga. It is clear, therefore, that a unique zeolitic material is produced under the restricted conditions described herein. These novel hydroxyl-rich zeolitic materials are significant for several reasons. New silanols may be formed due to rehydration of strained siloxane bridges formed during framework dealumination. Alternatively, they may represent the hydration of extra-lattice aluminum. The former rationale appears more consistent with the observed FTIR absorbance near 3720 cm$^{-1}$, which is very near to other reported silanol stretching frequencies. Indeed, with zeolite beta the new absorbance actually overlaps with existing terminal silanols. Substitution of these hydroxyls, therefore, could render framework dealuminated zeolites more like that of as-synthesized materials, i.e. fewer defects. Parenthetically substitution of these hydroxyl can be undertaken as previously indicated by reaction of the hydroxyls of the hydroxyl-rich zeolite with $SiCl_4$ and $AlCl_3$.

In practicing the invention, it may be desirable to formulate the catalyst system of the invention with another material resistant to the temperature and other conditions of the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays, which can be composited with the zeolite include those of the montmorillonite and kaolin families, which families includes the sub-bentonites and the kaolins commonly known as Dixie, McNamee:Georgia and Florida clays or others in which the main mineral constituent is halloysite, kaolinite, dickite, nacrite or anauxite. Such clays can be used in a raw state as originally mined or initially subjected to calcination acid treatment or chemical modification.

In addition to the foregoing materials, the zeolite employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix may vary widely with the zeolite content ranging from between about 1 to about 99 percent by weight and more usually in the range of about 5 to about 80 percent by weight of the composite.

It is readily apparent that zeolites produced in accordance with the invert may be employed in hydrocarbon conversions, described in the prior art to which the zeolites are particularly applicable. These new hydrogen transfer including inter alia hydrogenation (olefins or aromatics), dehydrogenation, isomerization, chemisorption and isotope exchange conversions are conducted at temperatures of ambient to 450° C., at pressures from subatmospheric to several hundred atmospheres, a liquid hourly space velocity between 0.1 and 10, and a hydrogen to hydrocarbon (feed) mole ratio of 0 to 20.

EXAMPLES

Example 1

A sample of platinum (0.6 wt %) on steamed treated (538° C., 16 hrs) zeolite beta was subjected to hydrogen, and then, its chemisorptive properties were determined by temperature programmed desorption (FIG. 1). The measured H/Pt ratio of about one is characteristic of hydrogen chemisorbing exclusively on the platinum metal. The amount of hydrogen that desorbed above 350° C. is about 0.33 H/Pt. Hydroxyl content of this parent sample was determined by FTIR (FIG. 2, Curve A).

Example 2

Figure 3A:
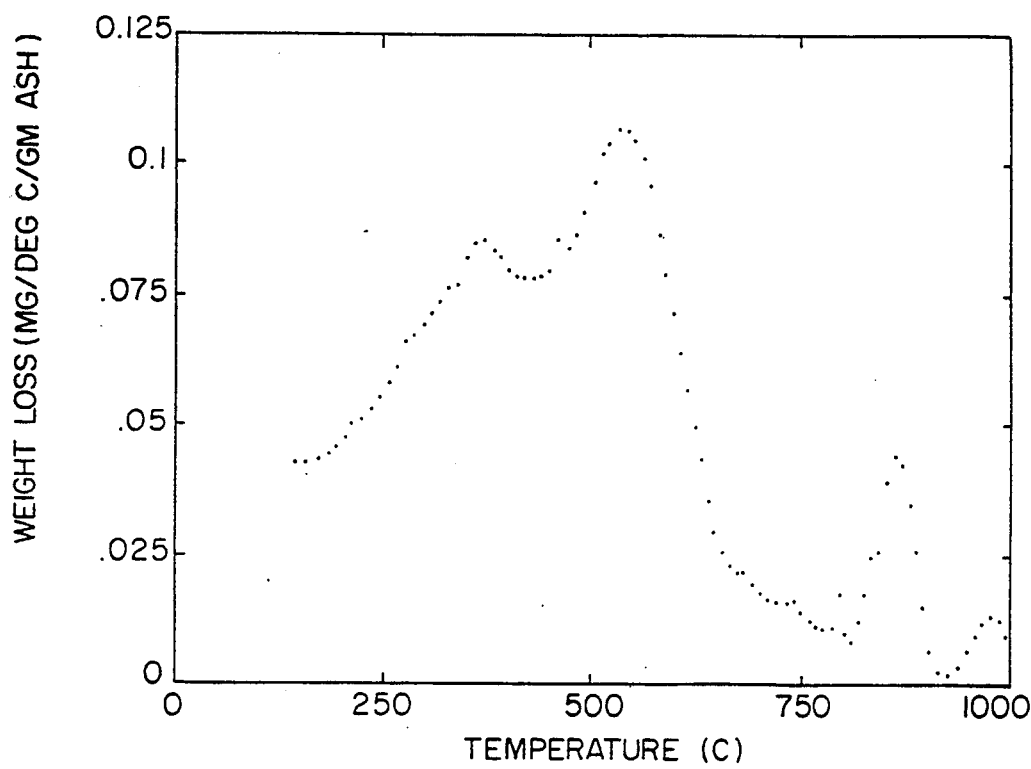
FIG. 3 includes a plot of ammonia desorption vs temperature.
Figure 3B:
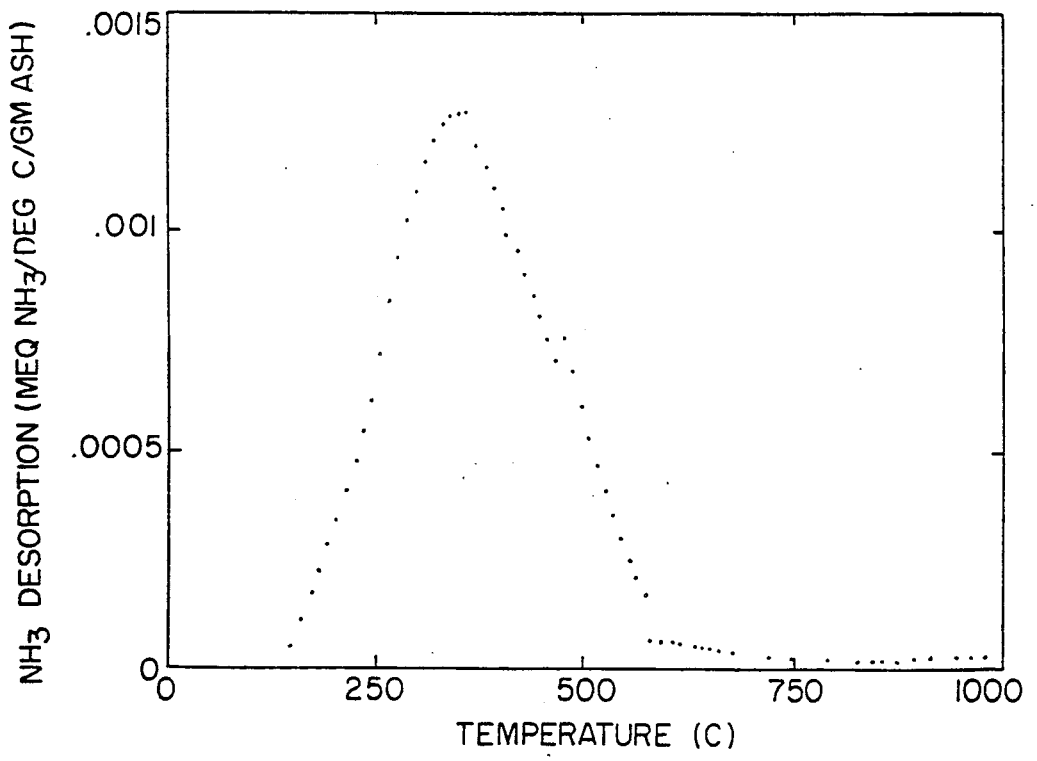
Figure 4:
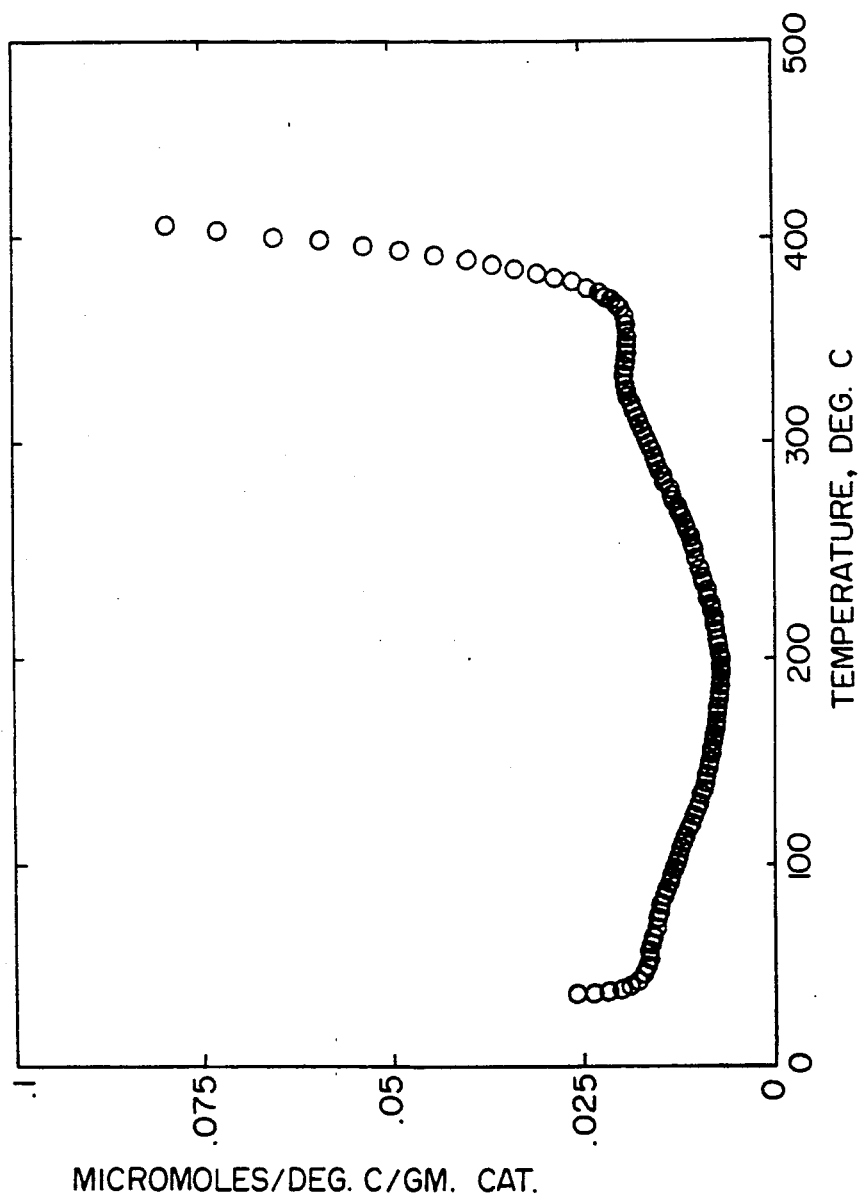
FIG. 4 is a plot of hydrogen desorption vs temperature of the composition of Example 2.

A sample of the starting material described in Example 1 (0.6 wt % platinum on zeolite beta steam treated at 538° C. for 16 hours) was treated with dry ammonia gas at room temperature (5 doses). The sample was shown to be hydroxyl-enriched by TPAD and FTIR. TPAD (FIG. 3) showed a distinct weight loss ($T_{max}$ about 525° C.) well above the temperature of maximum rate of ammonia desorption ($T_{max}$ about 345° C.). The FTIR spectra showed significant increase in the hydroxyl-stretching band near 3740 cm$^{-1}$ after ammonia desorption at 400° C. (FIG. 2B). Furthermore the hydroxyl absorbance was returned to its original intensity by calcination at 500° C. (FIG. 2C). The sample was subjected to hydrogen chemisorption under conditions identical to Examle 1. The temperature programmed desorption profile (FIG. 4) showed rapid hydrogen desorption starting about 375° C. nd gave a H/Pt ratio far in excess of one (1.7). The amount of hydrogen that desorbed above 350° C. is about 1.2 H/Pt. This excess hydrogen is not observed in the parent sample and represents spillover of hydrogen from platinum onto the supporting hydroxyl-enriched zeolite-beta.

The following examples illustrate production of hydroxy rich zeolites produced prior to hydrogenation dehydrogenation incorporation as described in copending application Ser. No. 789,267.

Example 3

ZSM-5 ($SiO_2/Al_2O_3=70$) was calcined at high temperature (1000° C., 60 min) in an atmosphere of nitrogen. The FTIR spectra were run at ambient temperature (about 25° C.). The FTIR spectrum of the sample showed complete loss of the bridging hydroxyl stretching band (3610 cm$^{-1}$) associated with the Bronsted acid sites of zeolites. Only the terminal silanol stretching band (3745 cm$^{-1}$) remained. The calcined sample was then treated with gaseous ammonia at ambient room temperature in the presence of atmospheric humidity. The resulting ammoniated zeolite (approx. 0.10 meq $NH_3$/gm of ash) was desorbed in vacuo (400° C., 10$^{-5}$ torr) prior to spectral analysis. The FTIR spectrum now showed an entirely new hydroxyl stretching band near 3720 cm$^{-1}$. Increasing the sample temperature to 500° C. caused the rapid disappearance of the new band. Tpad analysis showed a major weight loss ($T_{max}-500°$ C.) at a temperature well above that for ammonia desorption ($T_{max}=290°$ C.), corresponding to dehydration

Example 4

A sample of ZSM-5 was steam calcined (538° C., 1 atm of steam, 6 hr), and showed a decreased bridging hydroxyl stretch (3610 cm$^{-1}$) in the FTIR spectrum. Ammoniation and calcination (as above) again provided a material with new hydroxyl groups absorbing near 3720 cm$^{-1}$. The thermal stability and tpad profile of this sample was consistent with that of Example 3.

Example 5

A sample of zeolite beta ($SiO_2/Al_2O_3=$about 40) was calcined at high temperature under a nitrogen atmosphere (850° C., 0.5 h). Treatment with ammonia gas and desorption (as above) provided a sample with an enhanced absorbance band at 3745 cm$^{-1}$. Though indistinguishable from the existing terminal silanol stretching frequency, increased concentration of hydroxyl groups in the sample may be deduced from increased absorbance by the Beers-Lambert Law.

Example 6

A sample of zeolite beta which had been steam calcined (500° C., 1 atm of steam, 16 hr) was ammoniated and desorbed as above. Tpad data again showed an increased hydroxyl group concentration due to this sample preparation. The hydroxyl-rich material, as before, underwent rapid dehydration when heated to 500° C.

Example 7

A sample of platinum on steamed zeolite beta (500° C., 1 atm of steam, 16 hr), which had been calcined to 500° C. during $H_2$ sorption studies, was treated with ammonia gas as described above. FTIR spectra following desorption at 400° C. (10$^{-5}$ torr) showed an increase in the 3745 cm$^{-1}$ hydroxyl band. The enhanced absorbance intensity diminished rapidly when the temperature was raised to 500° C. The tpad profiles showed weight losses at Tmax=290° C. (corresponding to ammonia desorption), Tmax—500° C. (corresponding to dehydration of the hydroxyls observed by FTIR), and Tmax=850° C. The latter weight loss of a non-basic substance, presumably water, is apparently due to the presence of platinum, since it was not observed with the pure zeolite.

Example 8

The thermally treated ZSM-5 sample of example 1 was exchanged with aqueous ammonium nitrate (1M) at room temperature (1 hr). FTIR spectral analysis and TPAD data were identical to those described for example 3.

Example 9

Thermally dehydroxylated ZSM-5 (example 3) was treated with ammonia gas, then desorbed at 400° C. (1 hr) under a stream of dry argon. The hydroxyl-rich sample was then treated with tetrachlorosilane carried in argon (100° C., 1-1.25 hr). Excess silane was removed by flushing with argon overnight. The silylated material was again treated with ammonia to regenerate any remaining hydroxyls. The identical procedure was followed with another sample, but the silylation temperature was increased to 200° C. Analysis of FTIR spectra of these samples revealed that destruction of these new hydroxyls had resulted from the silane treatment. Furthermore, the extent to which hydroxyl concentration is reduced increases with temperature.

Example 10

Thermally treated ZSM-5 (as in example 3) was treated with ammonia gas, then desorbed in a stream of dry argon (400° C., 1 hr). The hydroxyl-rich sample was subjected to the vapors of aluminum trichloride (1 gm/gm of zeolite) in an argon carrier gas (400° C., 3 passes, 0.5 hr each). Excess aluminum chloride was expelled by raising the reactor temperature (500° C., 1 hr). The sample was again ammoniated to regenerate any remaining hydroxyl groups. FTIR spectral analysis following ammonia desorption (400° C., 10-5 torr) revealed that the treatment had substantially decreased the concentration of the new hydroxyl groups.

What is claimed is:

1. A hydrogen transfer catayst composition comprising in combination a hydrogenation/dehydrogenation metal; a zeolite, having a constraint index of about 0.5 to about 12, measured at about 500° F. to 950° F., said zeolite having suffered a loss of framework aluminum; and having a Fourier Transfer Infrared Spectrograph which exhibits increased hydroxyl group content, different from that of the as-synthesized zoelite prior to loss of framework aluminum and different from that of the zeolite of increased hydroxyl group content heated to temperatures exceeding 500° C.; and hydrogen gas; wherein the hydrogenation/dehydrogenation metal comprises 0.1 to 20 weight percent of the composition, wherein the composition is characterized by a ratio of atoms of hydrogen to atoms of hydrogenation/dehydrogenation metal which exceeds 1.

2. The composition of claim 1, wherein the hydrogenation/dehydrogenation metal is platinum.

3. The composition of claim 1, wherein the zeolite is zeolite beta.

4. The composition of claim 2, wherein the zeolite is zeolite beta.

5. The composition of claim 1, in combination with a carrier material.

* * * * *